(12) United States Patent
Sakurai et al.

(10) Patent No.: US 7,988,368 B2
(45) Date of Patent: Aug. 2, 2011

(54) OPTICAL CONNECTOR

(75) Inventors: Wataru Sakurai, Yokohama (JP); Junji Fukui, Yokohama (JP); Mitsuaki Tamura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 310 days.

(21) Appl. No.: 12/255,485

(22) Filed: Oct. 21, 2008

(65) Prior Publication Data

US 2009/0097799 A1 Apr. 16, 2009

(30) Foreign Application Priority Data

Oct. 26, 2007 (JP) ................................. 2007-279278

(51) Int. Cl.
*G02B 6/38* (2006.01)
(52) U.S. Cl. ......................................................... 385/60
(58) Field of Classification Search ....................... 385/60
See application file for complete search history.

(56) References Cited

U.S. PATENT DOCUMENTS

| | | |
|---|---|---|
| 5,097,523 A | 3/1992 | Marie |
| 5,214,730 A | 5/1993 | Nagasawa et al. |
| 5,943,462 A | 8/1999 | Schofield et al. |
| 2006/0049386 A1* | 3/2006 | Kody et al. ................... 252/500 |
| 2006/0257079 A1* | 11/2006 | Ohtsuka et al. ................ 385/86 |
| 2007/0207668 A1* | 9/2007 | Masuzaki .................... 439/587 |

FOREIGN PATENT DOCUMENTS

| | | |
|---|---|---|
| DE | 102006019872 A1 | 10/2007 |
| EP | 0 427 613 A1 | 5/1991 |
| EP | 0 743 543 A2 | 11/1996 |
| EP | 1 775 610 A2 | 4/2007 |
| GB | 2 277 206 A | 10/1994 |
| JP | 04-347806 A | 12/1992 |
| JP | 09-304652 A | 11/1997 |
| JP | 2007-058099 A | 3/2007 |

* cited by examiner

*Primary Examiner* — Uyen Chau N Le
*Assistant Examiner* — Hoang Tran
(74) *Attorney, Agent, or Firm* — Global IP Counselors, LLP (57) ABSTRACT

An optical connector that is capable of ensuring excellent waterproofing using a simple structure is provided. The optical connector comprises a connector plug and socket. Each of the plug and socket have a housing, which has a cable-guiding part and a cable-retaining part; a ferrule disposed within the housing and to hold a leading-end part of an optical fiber exposed from a sheath of an optical cable; and a seal member disposed between the cable-guiding part and the cable-retaining part to seal the cable-guiding part.

11 Claims, 6 Drawing Sheets

OPTICAL CONNECTOR

BACKGROUND OF THE INVENTION

1. Field of the Invention

The present invention relates to an optical connector that can be used in an outdoor environment.

2. Description of the Background Art

Japanese Patent Application Laid-Open No. 4-347806 discloses an optical connector provided with a housing and a ferrule for holding an optical fiber that constitutes an optical fiber ribbon, the ferrule being positioned within the housing. Residential communication services, which is called as "Fiber to the home", employing optical fibers have increased in recent years. Accordingly, optical connectors for connecting optical fibers may be disposed outdoors for the purpose of installing optical fibers to a subscriber's residence, and waterproofing the optical connectors has become necessary. Waterproofing has not been substantially considered in conventional optical connectors.

SUMMARY OF THE INVENTION

One object of the present invention is to provide an optical connector that has a simple structure and can ensure excellent waterproofing using.

In order to accomplish the object, there is provided a connector comprising a first connector and a second connector arranged to be coupled to the first connector. The first connector has a first housing, which has a first cable-guiding part and a first cable-retaining part, a first ferrule disposed within the first housing, and to hold a leading-end part of an optical fiber that is exposed from a sheath of a first optical cable, and a first seal member disposed between the first cable-guiding part and the first cable-retaining part to seal the first cable-guiding part; and the second connector has a second housing to fit with the first housing, the second housing having a second cable-guiding part and a second cable-retaining part, a second ferrule disposed within the second housing and to hold a leading-end part of an optical fiber that is exposed from a sheath of a second optical cable, and a second seal member disposed between the second cable-guiding part and the second cable-retaining part to seal the second cable-guiding part.

In a state where the first housing and the second housing are fitted together, the first seal member and the second seal member are preferably elastically deformed; and the first ferrule and the second ferrule are preferably biased so that distal-end surfaces of the first ferrule and the second ferrule are pressed against each other. Each of the first seal member and the second seal member also preferably has an inner-layer part made of soft rubber and an outer-layer part made of hard rubber that is harder than the soft rubber.

A first protruding part that limits movement of the first ferrule relative to the first housing is preferably provided to one of the first housing and the first cable-retaining part; a first protrusion-receiving part that engages with the first protruding part is preferably provided to the other of the first housing and the first cable-retaining part; a second protruding part that limits movement of the second ferrule relative to the second housing is preferably provided to one of the second housing and the second cable-retaining part; and a second protrusion-receiving part that engages with the second protruding part is preferably provided to the other of the second housing and the second cable-retaining part.

The first housing preferably further has a concave connecting part accommodating the first ferrule; the second housing preferably further has a tubular connecting part accommodating the second ferrule, the second housing to fit with the concave connecting part; and a third seal member for sealing a connecting portion between the first housing and the second housing when the first housing and the second housing are fitted together is preferably provided to at least one of the concave connecting part and the tubular connecting part. The third seal member in this instance is preferably configured so as to elastically deform and expand between connecting end surfaces of the first housing and the second housing when the first housing and the second housing are fitted together. The third seal member also preferably has an inner-layer part made of soft rubber and an outer-layer part that is provided to the outside of the inner-layer part and is made of hard rubber that is harder than the soft rubber.

DETAILED DESCRIPTION OF THE INVENTION

The above-mentioned features and other features, aspects, and advantages of the present invention will be better understood through the following description, appended claims, and accompanying drawings. In the explanation of the drawings, an identical mark is applied to identical elements, and an overlapping explanation will be omitted.

Figure 1:
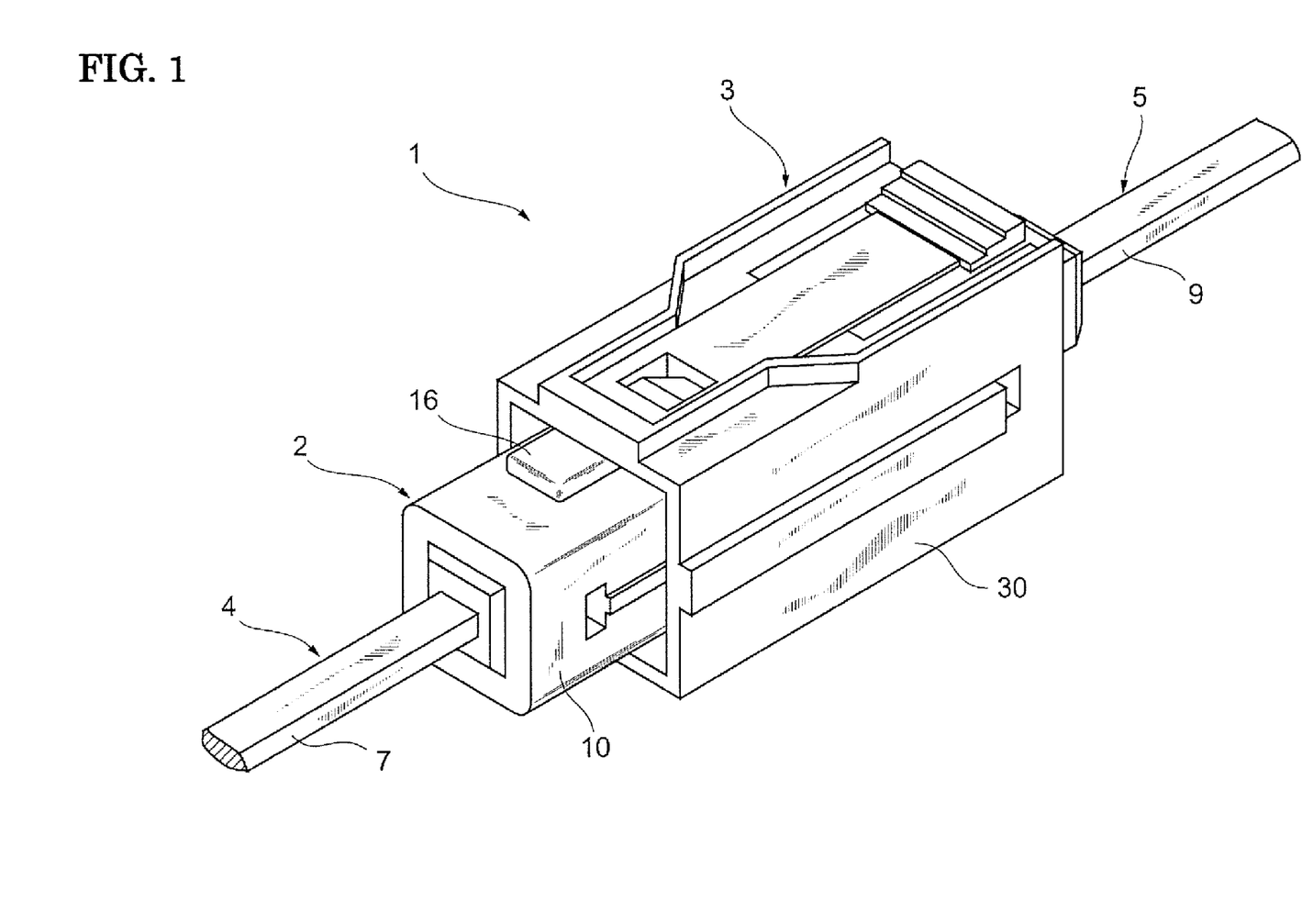
FIG. 1 is a perspective view that shows an embodiment of an optical connector according to the present invention, in which a first connector (connector plug) and a second connector (connector socket) are in a joined state.

FIG. 1 is a perspective view that shows an optical connector, and specifically an outdoor multifiber optical-relay connector 1, according to an embodiment of the present invention, in which a first connector (connector plug 2) and a second connector (connector socket 3) are in a joined state. The optical connector 1 is provided with the plug 2 and the socket 3, which is joined to the plug 2. The optical connector 1 connects a first optical cable (optical cable 4) attached to the plug 2 and a second optical cable (optical cable 5) attached to the socket 3. The optical cable 4 has a cable sheath 7 to cover an optical fiber ribbon 6, and the optical cable 5 has a cable sheath 9 to cover an optical fiber ribbon 8.

Figure 2:
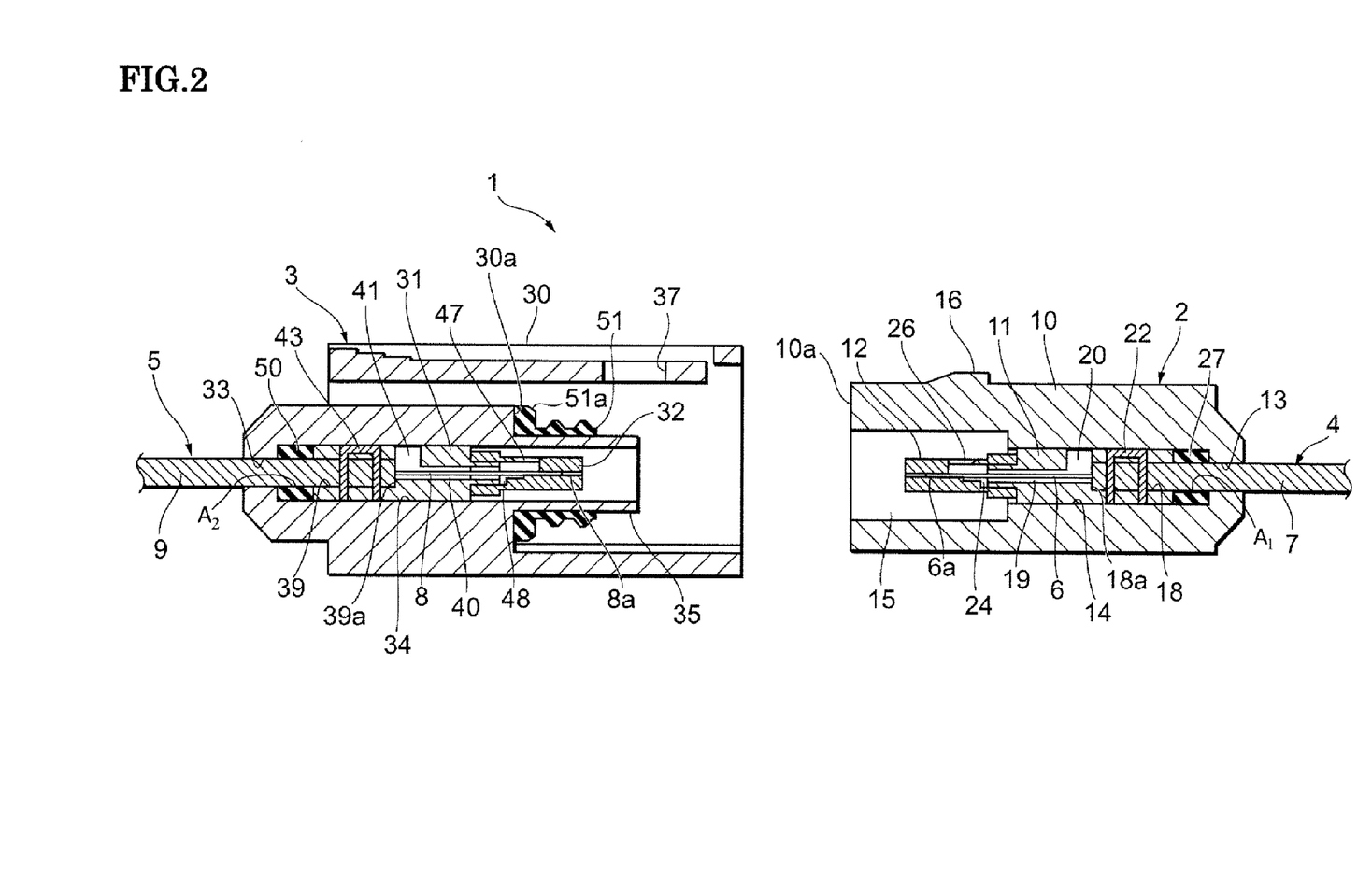
FIG. 2 is a vertical cross-sectional view that shows the optical connector of FIG. 1 in a state in which the plug and the socket are separated.
Figure 3:
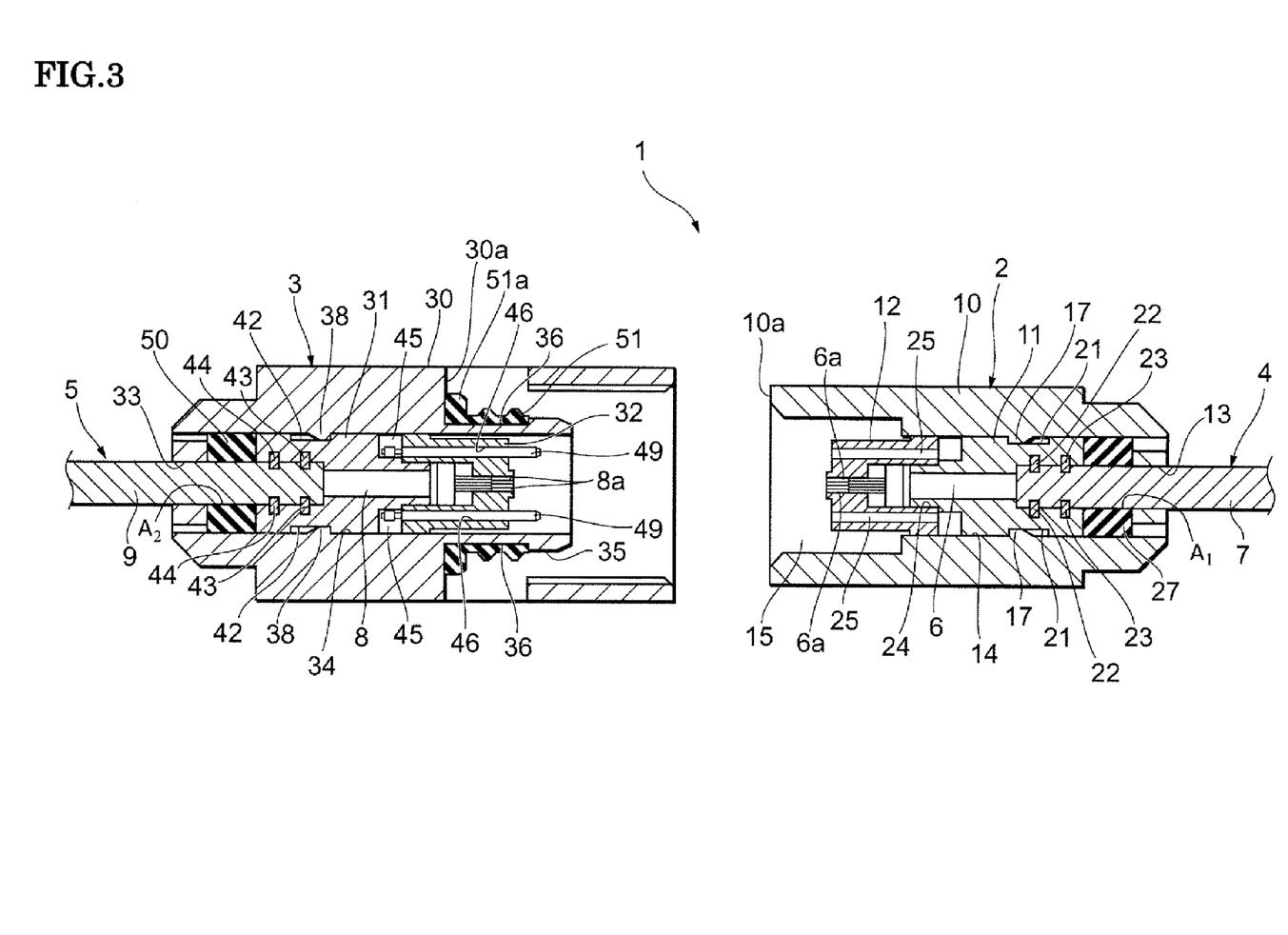
FIG. 3 is a horizontal cross-sectional view that shows the optical connector of FIG. 1 in a state in which the plug and the socket are separated.

FIGS. 2 and 3 are, respectively, a perpendicular cross-sectional view and a horizontal cross-sectional view that show the optical connector 1 in a state in which the connector plug 2 and the connector socket 3 are separated. The plug 2 has a male first housing (housing 10), which has a substantially rectangular cross-section, an anchor 11 disposed within the housing 10, and a first ferrule (ferrule 12) attached to the leading-end part of the anchor 11.

The housing 10 has a first cable-guiding part (cable-guiding part 13) for guiding the optical cable 4 into the housing 10, a first cable-retaining part (cable-retaining part 14) positioned in front of the cable-guiding part 13 (towards the ferrule 12), and a concave connecting part 15 positioned in front of the cable-retaining part 14. The cable-retaining part 14 accommodates the anchor 11, and the concave connecting part 15 accommodates the ferrule 12. A protrusion 16 for latching the plug 2 to the socket 3 is provided to the upper surface of the housing 10. First protruding parts (protrusions 17) for limiting the motion of the ferrule 12 relative to the housing 10 are provided to both left and right internal wall surfaces of the housing 10. Polybutylene terephthalate (PBT) is preferably used as the material of the housing 10.

The anchor 11 has a sheath-holding part 18 for holding the cable sheath 7 of the optical cable 4 in position, and a fiber ribbon insertion hole 19 into which the optical fiber ribbon 6 that is exposed by removing the distal-end portion of the cable sheath 7 is inserted. The boundary portion between the sheath-holding part 18 and the fiber ribbon insertion hole 19 forms a step part 18a. A window 20 for verifying the retained state of the optical cable 4 is formed on the upper surface of the anchor 11. The leading-end part of the anchor 11 is made into a protruding shape. A first protrusion-receiving part (groove 21) for engaging with the protrusions 17 is formed on each lateral surface of the anchor 11.

A wedge-insertion channel 23 into which a U-shaped wedge 22 for retaining the cable sheath 7 to the anchor 11 is inserted is formed in pairs on each of the left and right sides of the sheath-holding part 18. A plurality of blade parts (not shown) is provided to the wedges 22. These blade parts are driven into the cable sheath 7, whereby the cable sheath 7 is retained to the anchor 11.

The ferrule 12 is an MT connector ferrule and holds a plurality (four in this case) of optical fibers 6a that are exposed by removing the protective coating on the leading-end part of the optical fiber ribbon 6. A retaining concave part 24 into which the front-end part of the anchor 11 is fitted is formed on a rear part of the ferrule 12. Guide-pin holes 25 into which guide pins 49 (described hereinafter) are inserted are formed on both the left and right sides of the ferrule 12. A window 26 for injecting adhesive in order to retain the optical fibers 6a to the ferrule 12 is formed on the ferrule 12.

Figure 4:
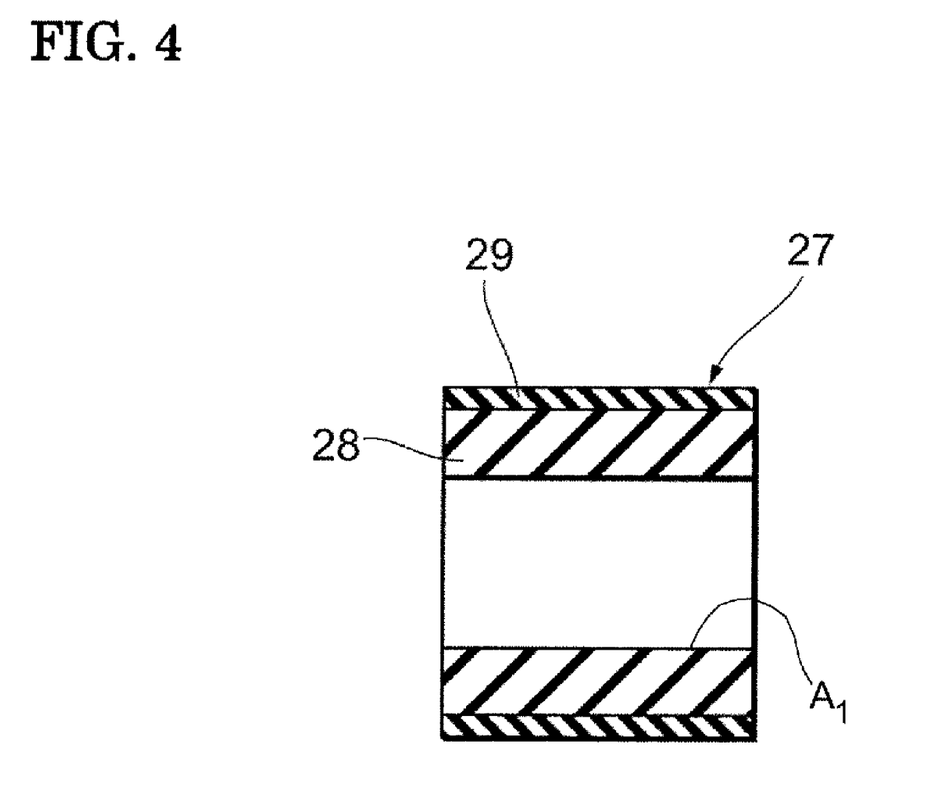
FIG. 4 is cross-sectional view of the cable seal member in the plug.

A first seal member (cable seal member 27) for sealing the optical-cable-guiding part 13 is disposed between the anchor 11 and the cable-guiding part 13. The cable seal member 27 is elastic and acts as a pressure spring for biasing the ferrule 12 toward the front of the housing 10. The surface of the cable seal member 27 is not shown but is made into an irregular shape in order to attain a proper seal. The cable seal member 27 also includes an aperture $A_1$, as shown in FIGS. 2, 3 and 4. The optical cable 4 extends through the aperture $A_1$, as shown in FIGS. 2 and 3.

FIG. 4 is a cross-sectional view of the cable seal member 27 of the connector plug 2. The cable seal member 27 has an inner-layer part 28 made of, e.g., a silicon-based soft rubber, and an outer-layer part 29 made of, e.g., a fluorine-based hard rubber. The cable seal member 27 is made into a two-layered structure, whereby the elasticity of the cable seal member 27 can be 20 maintained while damage and like to the cable seal member 27 due to the housing 10 can be prevented.

The connector socket 3 has a female second housing (housing 30), which has a substantially rectangular cross-section, a second cable-retaining part (anchor 31) disposed within the housing 30, and a second ferrule (ferrule 32) attached to the leading-end part of the anchor 31.

The housing 30 has a second cable-guiding part (cable-guiding part 33) for guiding the optical cable 5 into the housing 30, a second cable-retaining part (cable-retaining part 34) positioned in front of the cable-guiding part 33 (towards the ferrule 32), and a tubular connecting part 35 that fits to the concave connecting part 15 of the housing 10 and is positioned in front of the cable-retaining part 34. The cable-retaining part 34 accommodates the anchor 31, and the tubular connecting part 35 accommodates the ferrule 32. Seal-mounting grooves 36 are formed on both lateral surfaces of the tubular connecting part 35.

A protrusion-receiving hole part 37 for engaging with the protrusion 16 of the housing 10 is formed on the upper part of the housing 30. Second protruding parts (protrusions 38) for limiting the motion of the ferrule 32 relative to the housing 30 are provided to both left and right internal wall surfaces of the housing 30. PBT is preferably used as the material of the housing 30.

The anchor 31 has a sheath-holding part 39 for holding the cable sheath 9 of the optical cable 5 in position, and a fiber ribbon insertion hole 40 into which the optical fiber ribbon 8 that is exposed by removing the distal-end portion of the cable sheath 9 is inserted. The boundary portion between the sheath-holding part 39 and the fiber ribbon insertion hole 40 forms a step part 39a. A window 41 for verifying the retained state of the optical cable 5 is formed on the upper surface of the anchor 31. The front-end part of the anchor 31 is made into a protruding shape. A second protrusion-receiving part (groove 42) for engaging with the protrusions 38 provided to the housing 30 is formed on each lateral surface of the anchor 31.

A wedge-inserting channel 44 into which a U-shaped wedge 43 for retaining the cable sheath 9 to the anchor 31 is inserted is formed in pairs on each of the left and right sides of the sheath-holding part 39. The structure of the wedges 43 is the same as the structure of the wedges 22. Blade parts (not shown) of the wedges 43 are driven into the cable sheath 9, whereby the cable sheath 9 is retained to the anchor 31.

Guide-pin holding parts 45 for holding the trailing-end parts of the guide pins 49 (described hereinafter) are provided to both the left and right sides of the anchor 31. The guide-pin holding parts 45 are displayed in a simplified manner in the drawings.

The ferrule 32 is an MT connector ferrule like the ferrule 12. The ferrule 32 has guide-pin holes 46 and a window 47 via which an adhesive is injected. The ferrule 32 holds a plurality (four in this case) of optical fibers 8a that are exposed by removing the protective coating on the leading-end part of the optical fiber ribbon 8. A retaining concave part 48 into which the front-end part of the anchor 31 is fitted is formed on a rear part of the ferrule 32. Guide pins 49 are inserted into each of the guide-pin holes 46 of the ferrule 32 so as to protrude from the front-end surface (the connecting-end surface) of the ferrule 32.

A second seal member (cable seal member 50) for sealing the optical-cable-guiding part 33 is positioned between the anchor 31 and the cable-guiding part 33. The cable seal member 50 is elastic and acts as a pressure spring for biasing the ferrule 32 toward the front of the housing 30. The structure of the cable seal member 50 is the same as the cable seal member 27. The cable seal member 50 also includes an aperture $A_2$. The optical cable 5 extends through the aperture $A_2$, as shown in FIGS. 2 and 3.

A third seal member (connecting seal member 51) is mounted on the outer surface of the tubular connecting part 35 of the housing 30 and is fitted to the seal-mounting grooves 36. A flange part 51a is provided to one end part of the connecting seal member 51. The connecting seal member 51 is attached to the tubular connecting part 35 so as to position the flange part 51a towards the rear of the housing 30. The surface of the connecting seal member 51 is made into an irregular shape in order to form a proper seal. The connecting seal member 51 also has an inner-layer part made of soft rubber and an outer-layer part made of hard rubber, like the cable seal members 27, 50. The elasticity of the third seal member is thereby ensured by the soft rubber, and the mechanical strength of the third seal member is ensured by the hard rubber.

The optical cable 4 is attached to the connector plug 2 as follows. First, the optical cable 4 is inserted into the housing 10 from the rear side so as to pass through the cable seal member 27 in a state in which the cable seal member 27 is mounted on the rear part of the cable-retaining part 14 of the housing 10. The ferrule 12 is retained to the front-end part of the anchor 11.

The optical cable 4 is then inserted into the sheath-holding part 18 of the anchor 11 so that the optical fiber ribbon 6, which is exposed from the cable sheath 7 of the optical cable 4, is guided into the ferrule 12. When the optical cable 4 is inserted to a position where the cable sheath 7 contacts to the step part 18a of the anchor 11, the two wedges 22 are brought along the wedge-inserting channels 23 of the anchor 11, and the blade parts (not shown) of the wedges 22 are driven into the cable sheath 7. The cable sheath 7 is thereby retained to the anchor 11. The optical cable 4 can be checked for buckling via the window 20 of the anchor 11 at this point.

Adhesive is applied from the window 26 of the ferrule 12, whereby the optical fiber ribbon 6 is retained to the ferrule 12. The front-end surface of the ferrule 12 is polished in this state. The leading-end positions of the optical fibers 6a of the optical fiber ribbon 6 are made to meet the front-end surface of the ferrule 12 at this point.

The housing 10 and the cable seal member 27 are then drawn toward the anchor 11, and the protrusions 17 provided to the housing 10 are made to enter the protrusion-receiving grooves 21 formed in the anchor 11, whereby the anchor 11 becomes interlocked with the housing 10, and the assembly of the optical cable 4 with the plug 2 is complete.

The optical cable 5 is attached to the socket 3 as follows. First, the optical cable 5 is inserted into the housing 30 from the rear side so as to pass through the cable seal member 50 in a state in which the cable seal member 50 is mounted on the rear part of the cable-retaining part 34 of the housing 30. The ferrule 32 is retained to the front-end part of the anchor 31.

The optical cable 5 is then inserted into the sheath-holding part 39 of the anchor 31 so that the optical fiber ribbon 8, which is exposed from the cable sheath 9 of the optical cable 5, is guided into the ferrule 32. When the optical cable 5 is inserted to a position where the cable sheath 9 contacts the step part 39a of the anchor 31, the two wedges 43 are brought along the wedge-inserting channels 44 of the anchor 31, and the blade parts (not shown) of the wedges 43 are driven into the cable sheath 9. The cable sheath 9 is thereby retained to the anchor 31. The optical cable 5 can be checked for bucking via the window 41 of the anchor 31 at this point.

Adhesive is applied from the window 47 of the ferrule 32, whereby the optical fiber ribbon 8 is retained to the ferrule 32. The front-end surface of the ferrule 32 is polished in this state. The leading-end positions of the optical fibers 8a of the optical fiber ribbon 8 are made to meet the front-end surface of the ferrule 32 at this point.

The housing 30 and the cable seal member 50 are then drawn toward the anchor 31, and the protrusions 38 provided to the housing 30 are made to enter the protrusion-receiving grooves 42 formed in the anchor 31, whereby the anchor 31 becomes interlocked with the housing 30.

The connecting seal member 51 is then mounted on the tubular connecting part 35 of the housing 30, and, last, the pair of the guide pins 49 is inserted into the guide-pin holes 46 of the ferrule 32. The assembly of the optical cable 5 with the socket 3 is thereby complete.

Figure 5:
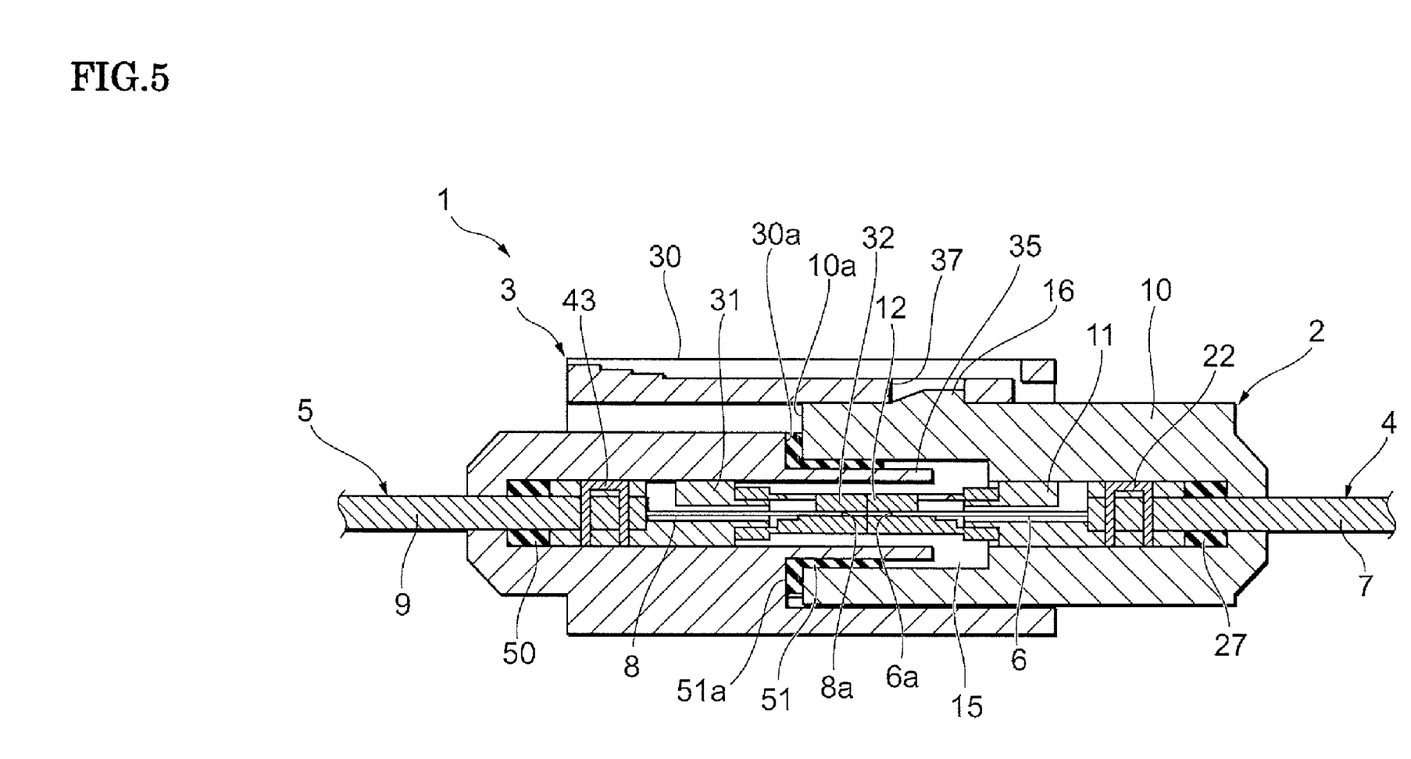
FIG. 5 is a vertical cross-sectional view that shows the optical connector of FIG. 1 in a state in which the plug and the socket are joined.
Figure 6:
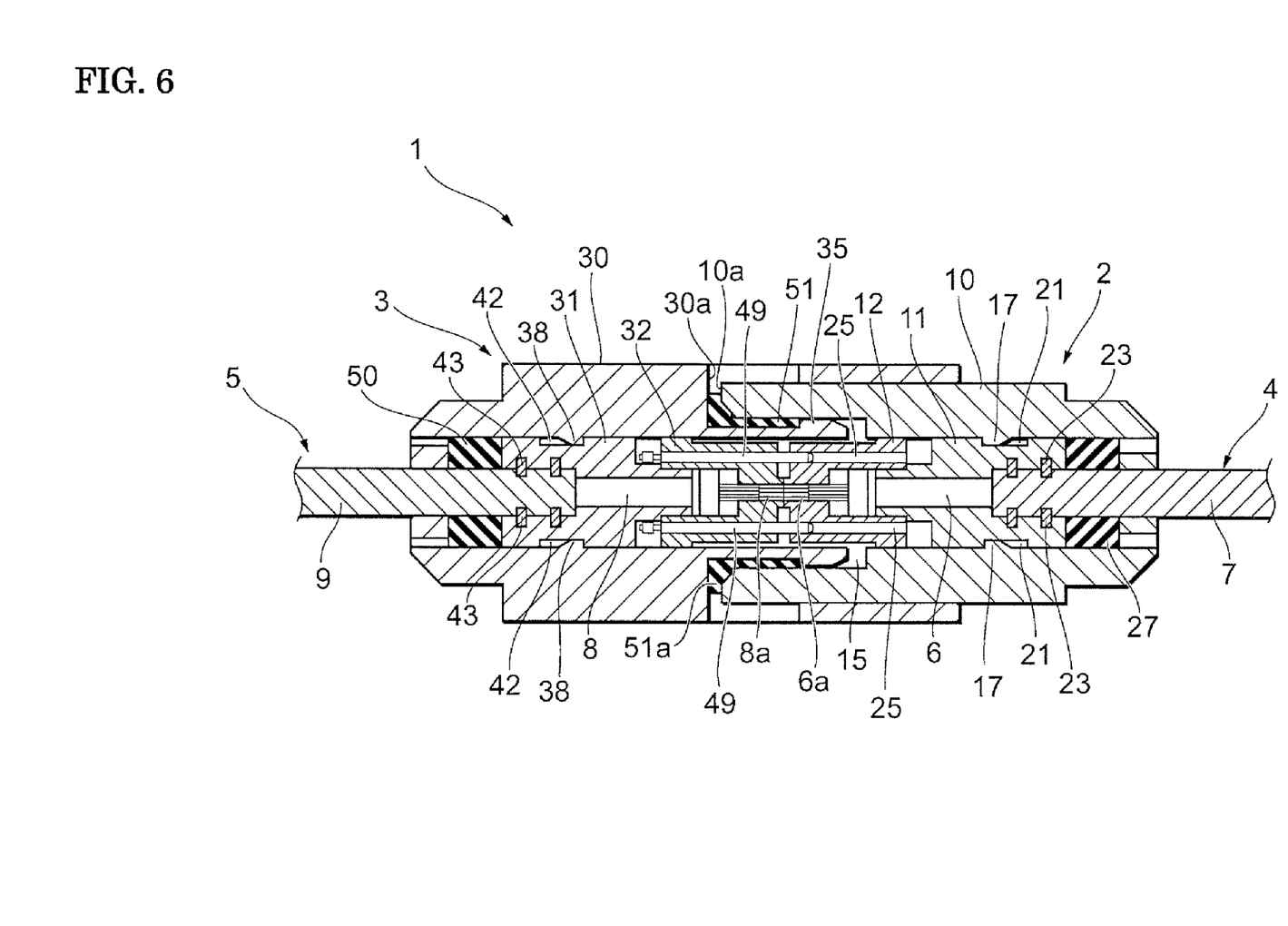
FIG. 6 is a horizontal cross-sectional view that shows the optical connector of FIG. 1 in a state in which the plug and the socket are joined.

When joining the plug 2 and the socket 3, the housings 10, 30 are fitted together so that the protrusion 16 provided to the housing 10 of the plug 2 lodges in the protrusion-receiving hole part 37 formed in the housing 30 of the socket 3. FIGS. 5 and 6 are, respectively, a vertical cross-sectional view and a horizontal cross-sectional view that show the optical connector 1 in a state in which the connector plug 2 and the connector socket 3 are joined. The tubular connecting part 35 of the housing 30 is inserted into the concave connecting part 15 of the housing 10, the guide pins 49 attached to the ferrule 32 of the socket 3 are inserted into the guide-pin holes 25 formed in the ferrule 12 of the plug 2, and the front-end surfaces of the ferrules 12, 32 are brought in contact with each other.

At this time, the cable seal members 27, 50 provided to the plug 2 and the socket 3, respectively, function as springs that bias in the direction in which the leading-end surfaces of the ferrules 12, 32 press against each other. The cable seal members 27, 50 are therefore elastically deformed and compressed in the longitudinal direction of the connector, the front-end surfaces of the ferrules 12, 32 are pressed together, and the optical fibers 6a, 8a can be held in a connected state without a ferrule-pressing spring being provided to the plug 2 and the socket 3.

Since the anchor 11 of the plug 2 is interlocked with the housing 10, rearward movement of the anchor 11 and the first ferrule which is fixed to the anchor 11, is limited even when the optical cable 4 is subjected to tension. In the same manner, the anchor 31 of the socket 3 is interlocked with the housing 30, and therefore rearward movement of the anchor 31 and the second ferrule which is fixed to the anchor 31 is retained, is limited even when the optical cable is subjected to tension. The leading-end surfaces of the first ferrule and the second ferrule are thereby prevented from separating, and the connection between the optical fibers 6a, 8a is prevented from breaking.

The cable seal member 27 is provided adjoining the cable-guiding part 13 within the housing 10 of the plug 2, and therefore rainwater and the like can be prevented from seeping into the housing 10 from the gap between the housing 10 and the optical cable 4. In the same manner, the cable seal member 50 is provided adjoining the cable-guiding part 33 within the housing 30 of the socket 3, and therefore rainwater and the like can be prevented from seeping into the housing 30 from the gap between the housing 30 and the optical cable 5.

When the housings 10, 30 are fit together, the flange part 51a of the connecting seal member 51 elastically deforms between the connecting-end surface (front-end surface) 10a of the housing 10 and the connecting-end surface 30a of the housing 30 and expands outward. The adhesion between the connecting-end surfaces 10a, 30a and the connecting seal member 51 is therefore adequately improved, and the seal between the connecting-end surfaces 10a, 30a due to the connecting seal member 51 becomes tighter. Rainwater and the like can thereby be prevented from seeping into the housings 10, 30 from the connecting portions of the housings 10, 30. Waterproofing of the first connector and the second connector can thereby be adequately ensured.

In the present embodiment as described above, rainwater and the like are prevented from seeping into the internal parts of the housing 10 and the housing 30 from the first cable-guiding part and the second cable-guiding part by the cable seal members 27, 50 when the optical connector 1 is used in an outdoor environment. Rainwater and the like are also prevented from seeping into the housings 10, 30 by the connecting seal member 51. It is thus possible to prevent the occurrence of faults resulting from, e.g., rainwater and the like freezing and thereby pressing on the optical fibers 6a, 8a and exerting deleterious effects on the optical characteristics of the optical fibers and on the connectivity of the optical fibers.

Usage is therefore possible without causing particular defects, even when the housings 10, 30 are in an exposed state. A special waterproofing member for covering the housings 10, 30 therefore need not be prepared. The use of the cable seal members 27, 50 also eliminates the need for a spring member for pressing the ferrules 12, 32 to be separately provided. Excellent waterproofing can thereby be ensured in a simple structure while reducing costs. As a result, an outdoor optical connector that is extremely economical, easy to assemble, and has excellent waterproofing can be obtained.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

The mechanism of engagement of the housing 10 and the anchor 11 in the plug 2 may also involve, e.g., providing a protrusion to the anchor 11 and forming a protrusion-receiving groove in the housing 10, in an arrangement that is the opposite of the one in the aforedescribed embodiment. The same applies to the socket 3. The mounting position of the connecting seal member may also be on the internal wall surface of the housing 10 for forming the concave connecting part 15 in the plug 2 and not on an outer surface of the tubular connecting part 35 of the housing 30 in the socket 3. Connecting seal members may also be mounted on both the outer surface of the tubular connecting part 35 of the housing 30 and the internal wall surface of the housing 10 for forming the concave connecting part 15. A multi-fiber ferrule was used for holding the optical fiber ribbon in the aforedescribed embodiment, but a single-fiber ferrule is used for holding a single buffered optical fiber when the optical cable contains a single buffered optical fiber.

The entire disclosure of Japanese Patent Application No. 2007-279278 filed on Oct. 26, 2007, including the specification, claims, drawings, and summary, is incorporated herein by reference in its entirety.

What is claimed is:

1. An optical connector comprising:
a first connector;
a first optical cable including a first optical fiber and a first sheath, one end of the first sheath being disposed within the first connector with a leading-end part of the first optical fiber extending out of the first sheath within the first connector;
a second connector arranged to be coupled to the first connector; and
a second optical cable including a second optical fiber and a second sheath, one end of the second sheath being disposed within the second connector with a leading-end part of the second optical fiber extending out of the second sheath within the second connector,
the first connector including a first housing having a first cable-guiding part and a first cable-retaining part, a first ferrule disposed within the first housing, and configured and arranged to hold the leading-end part of the first optical fiber, and a first seal member disposed between the first cable-guiding part and the first cable-retaining part to seal the first cable-guiding part, the first seal member having an aperture with the first sheath of the first optical cable extending through the aperture, and
the second connector including a second housing configured and arranged to fit with the first housing, the second housing having a second cable-guiding part and a second cable-retaining part, a second ferrule disposed within the second housing, and configured and arranged to hold the leading-end part of the second optical fiber, and a second seal member disposed between the second cable-guiding part and the second cable-retaining part to seal the second cable-guiding part, the second seal member having a second aperture with the second sheath of the second optical cable extending through the second aperture.

2. The optical connector according to claim 1, wherein the first seal member and the second seal member are configured and arranged to be elastically deformed with the first housing and the second housing being fitted together biasing the first ferrule and the second ferrule so that distal-end surfaces of the first ferrule and the second ferrule are pressed against each other.

3. The optical connector according to claim 1, wherein each of the first seal member and the second seal member has an inner-layer part made of soft rubber and an outer-layer part made of hard rubber that is harder than the soft rubber.

4. The optical connector according to claim 1, wherein the first housing includes a first protruding part that limits movement of the first ferrule relative to the first housing, and
the first cable-retaining part includes a first protrusion-receiving part that engages with the first protruding part.

5. The optical connector according to claim 1, wherein the first housing further has a concave connecting part accommodating the first ferrule,
the second housing further has a tubular connecting part accommodating the second ferrule, the second housing being configured and arranged to fit with the concave connecting part, and
at least one of the concave connecting part and the tubular connecting part includes a third seal member configured and arranged to seal a connecting portion between the first housing and the second housing when the first housing and the second housing are fitted together.

6. The optical connector according to claim 5, wherein the third seal member is configured and arranged to elastically deform and expand between connecting end surfaces of the first housing and the second housing when the first housing and the second housing are fitted together.

7. The optical connector according to claim 5, wherein the third seal member has an inner-layer part made of soft rubber and an outer-layer part that is provided to the outside of the inner-layer part and is made of hard rubber that is harder than the soft rubber.

8. The optical connector according to claim 4, wherein the second housing includes a second protruding part that limits movement of the second ferrule relative to the second housing, and
the second cable-retaining part includes a second protrusion-receiving part that engages with the second protruding part.

9. The optical connector according to claim 1, wherein the first connector includes a first anchor and a first wedge, the first anchor being accommodated in the first cable-retaining part and the first anchor retaining the first sheath of the first optical cable to the first anchor.

10. The optical connector according to claim 9, wherein
the second connector includes a second anchor and a second wedge, the second anchor being accommodated in the second cable-retaining part and the second anchor retaining the second sheath of the second optical cable to the second anchor.

11. The optical connector according to claim 5, wherein
the first connector and the second connector are dimensioned such that with the first connector fitted to the second connector, the first seal member, the second seal member, the third seal member seal, the first connector and the second connector provide waterproofing for the one end of the first sheath, the leading-end part of the first optical fiber, the one end of the second sheath and the leading-end part of the second optical fiber within the first connector and the second connector.

* * * * *